Figure 1:
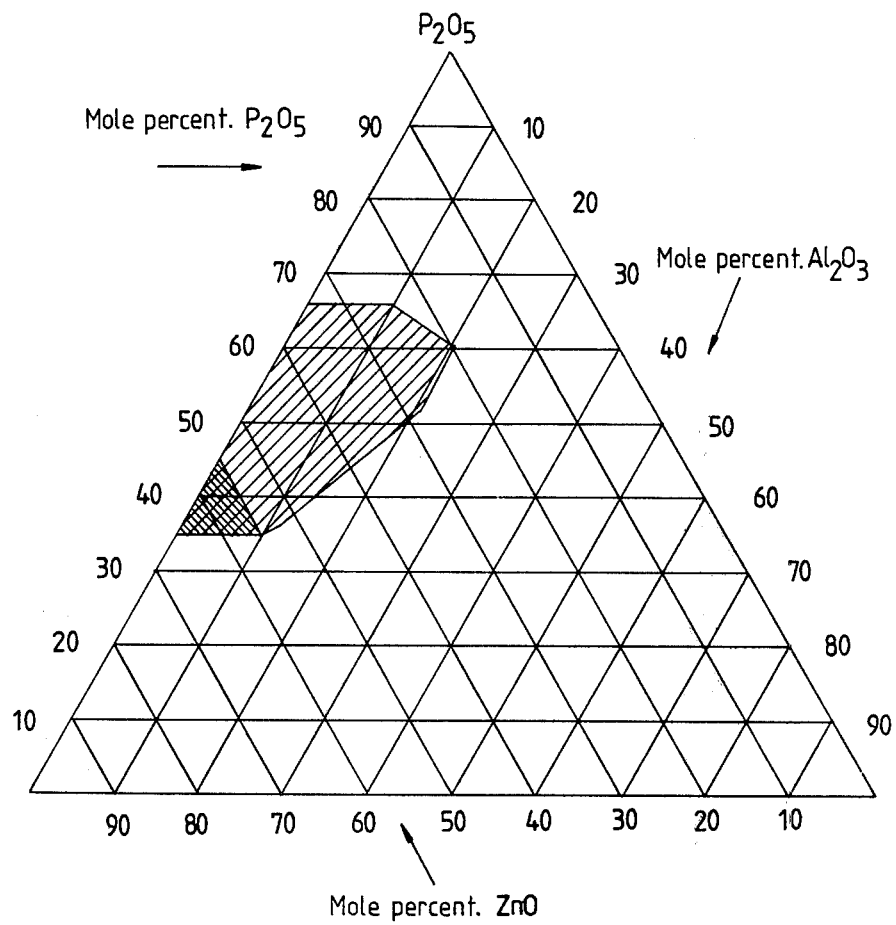

United States Patent [19]

Drake

[11] 4,346,184

[45] Aug. 24, 1982

[54] COATING COMPOSITIONS FOR INHIBITING CORROSION OF METAL SURFACES

[75] Inventor: Cyril F. Drake, Harlow, England

[73] Assignee: International Standard Electric Corporation, New York, N.Y.

[21] Appl. No.: 206,426

[22] Filed: Nov. 13, 1980

Related U.S. Application Data

[63] Continuation-in-part of Ser. No. 912,129, Jun. 2, 1978, Pat. No. 4,210,575.

[30] Foreign Application Priority Data

Nov. 15, 1979 [GB] United Kingdom ................ 7939544

[51] Int. Cl.$^3$ ...................... C08L 63/00; C08L 67/00; C08L 35/00
[52] U.S. Cl. ................ 523/451; 252/389 A; 524/414; 524/560; 524/571; 524/601; 501/11
[58] Field of Search ............. 260/40 R, 37 EP, 42.47, 260/42.48, 42.52; 106/14.44, 47 R; 252/389 A; 428/472; 523/451; 524/414

[56] References Cited

U.S. PATENT DOCUMENTS

| | | | |
|---|---|---|---|
| 2,400,147 | 5/1946 | Hooley | 106/47 |
| 3,341,453 | 9/1967 | Ralston | 106/47 |
| 3,615,758 | 10/1971 | McMillan | 106/47 |
| 3,732,181 | 5/1973 | Ray et al. | 260/42.52 |
| 3,885,973 | 5/1975 | Ray et al. | 106/47 P |
| 3,930,833 | 1/1976 | Roberts | 106/47 |
| 4,017,454 | 4/1977 | Muller | 260/42.52 |
| 4,141,877 | 2/1979 | Luttinger et al. | 260/40 R |
| 4,309,485 | 1/1982 | Kondo et al. | 428/472 |

*Primary Examiner*—Lewis T. Jacobs
*Attorney, Agent, or Firm*—James B. Raden; Harold J. Holt

[57] ABSTRACT

A corrosion inhibiting material comprises a water soluble zinc oxide/phosphorus pentoxide/alumina glass which, when in contact with water, releases ions which inhibit corrosion of adjacent metal surfaces. Advantageously the glass is finely ground and then dispersed in a resin carrier to form a paint. The glass composition is preferably 54.6 to 63.3 mol % zinc oxide, 35.8 to 45.3 mol % phosphorus pentoxide; the remainder at least 0.1 mol % aluminum oxide.

25 Claims, 3 Drawing Figures

COATING COMPOSITIONS FOR INHIBITING CORROSION OF METAL SURFACES

This application is a continuation-in-part of my copending application Ser. No. 912,129, filed June 2, 1978, now U.S. Pat. No. 4,210,575.

This invention relates to coating compositions for inhibiting corrosion of a metal surface to which they may be applied, to glasses for use in said coating compositions, to processes for the preparation and use of the composition.

One of the major problems involved in the use of metals as structural materials is that of corrosion of the metal, ferrous metals being particularly susceptible. The mechanism of corrosion is poorly understood, but it is well known that the process is accelerated under hostile conditions, typically in industrial and marine environments. The standard technique for reducing corrosion is to apply to the metal surface a primer coating containing one or more corrosion inhibiting materials. Such primer coatings generally comprise a resinous binding medium in which finely ground pigments are dispersed, the purpose of these pigments being either to provide opacity and colour or to provide corrosion inhibition, these latter being known active pigments. The most commonly used active pigments are red lead and calcium plumbate, but these materials are highly toxic. Zinc chromate is also employed as a corrosion inhibitor, but it does not possess the level of performance of the lead pigments and can also cause colour bleeding of a subsequent pain coat. Furthermore hexavalent chromium salts are suspected of having carcinogenic activity.

More recently zinc phosphate has been employed as a non-toxic alternative to lead and chromate pigments. Compositions employing this material are described in U.K. Patent Specifications Nos. 904,861 and 915,512. It is claimed that this material is almost as effective as the previously employed toxic pigments, but its performance is poor in certain binder media and under conditions of exposure where the atmospheric sulphur dioxide level is low, typically marine conditions.

The mechanism whereby zinc orthophosphate protects a metal surface is little understood, but it is thought to include anodic passivation by deposition of an impervious layer of the metal phosphate. The effectiveness of zinc orthophosphate as a corrosion inhibiting pigment is generally considered to be limited by its low solubility in water, which would explain why its activity is enhanced in high sulphur dioxide, e.g. industrial environments where it is solubilesed by the acid formed under aqueous corrosion conditions. Unfortunately the pH of the salt solution so formed is usually not the optimum value for providing adequate passivation of the metal nor for controlling the degree of polymerisation of the phosphate ion.

The object of the invention is to minimise or to overcome these disadvantages.

My copending British application No. 23790/77 (now U.S. Pat. No. 4,210,575) describes and claims a paint composition adapted to inhibit corrosion of a metal surface to which it is applied, the composition including a glass material dispersed in a resin carrier, in which said glass comprises as its major constituents phosphorus pentoxide and zinc oxide, which together provide the glass forming oxide and the glass modifying oxide of the glass, together with a minor proportion of one or more oxides of Group IIA or Group IIIA (the boron group) of the periodic table, the composition of the glass being such that, when the glass is contacted with water, zinc and phosphate ions leach into solution.

I have now found that within the phosphorus oxide/zinc oxide/aluminum oxide glass forming region certain composition ranges are particularly effective as corrosion inhibiting materials, particularly for structural components including e.g. bridges, buildings and shipping containers.

According to one aspect of the present invention there is provided a water soluble glass composition comprising 54.6 to 63.3 mol zinc oxide, 35.8 to 45.3 mol % phosphorus pentoxide, the remainder comprising at least 0.1 mol % aluminum oxide. In its preferred form, the glass composition is either from 55.3–57.3 mol % zinc oxide, 41.4 to 43.4 mol % phosphorus pentoxide and 1 to 2 mol % aluminum oxide or, alternatively, from 61.1 to 63.3 mol % zinc oxide, 35.8 to 37.8 mol % phosphorus pentoxide and 0.1 to 2 mol % aluminum oxide. The preferred compositions are especially effective for corrosion inhibition.

According to a further aspect of the invention there is provided a method of making a corrosion inhibiting paint composition, comprising providing a fine powder by fusing quantities of zinc oxide, phosphorus pentoxide and alumina or precursors thereof to form an homogeneous melt, quenching the melt to form a solid material, comminuting the solid material to the fine powder; and dispersing the powder in a paint binder medium.

According to a further aspect of the invention, there is provided a process of inhibiting the corrosion of a metal surface comprising coating said surface with a paint composition containing a water soluble glass composition dispersed in a paint binder in which said glass composition comprises phosphorus pentoxide and zinc oxide as its major constituents which together provide the glass forming oxide and glass modifying oxide repectively of said glass, said glass also comprising a minor proportion of aluminium oxide.

Figure 2:
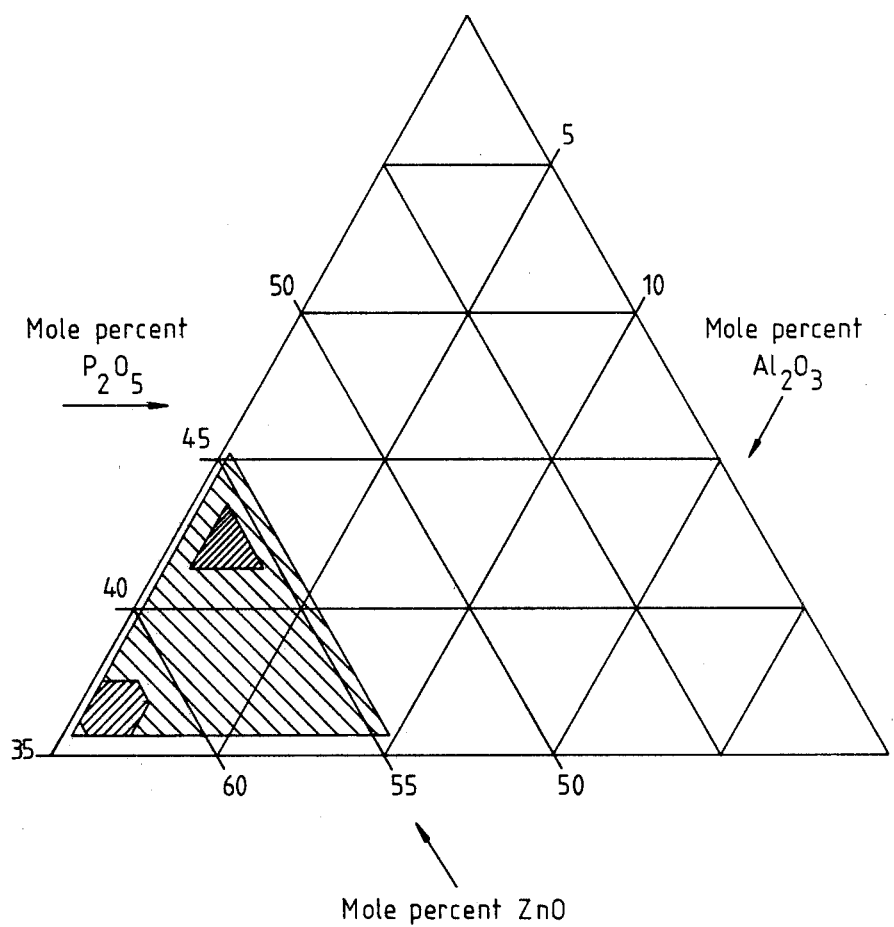
Figure 3:
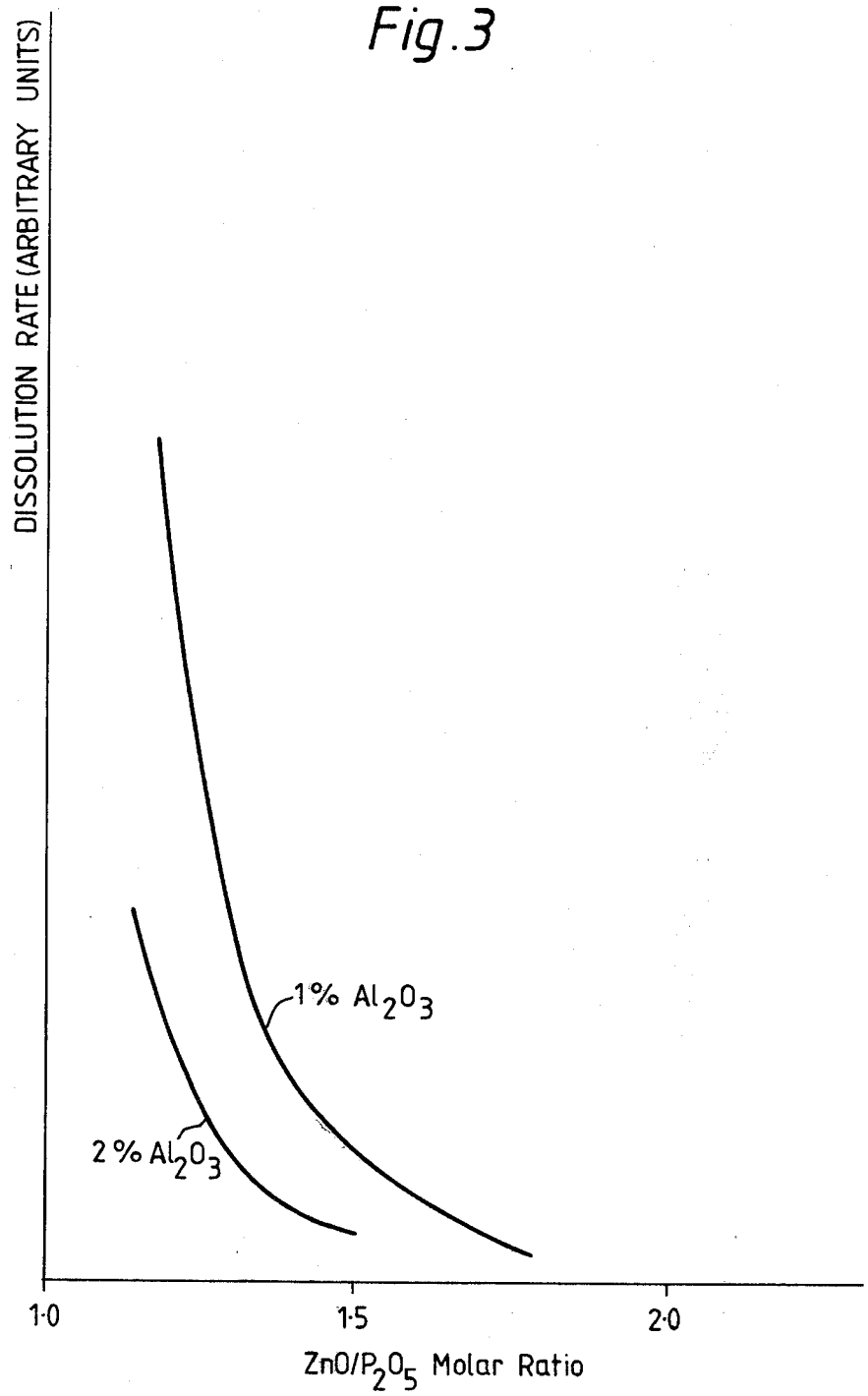

The invention will be better understood in connection with the accompanying drawing in which:

FIG. 1 is a ternary diagram showing the practical glass forming region of the three oxides essential in the glass composition of the invention and the glass forming region of the invention, FIG. 2 is an enlarged ternary diagram showing in greatere detail the glass forming region of the invention, and FIG. 3 is a graph showing approximately the change in dissolution rate with ratio of Zn to P.

All the glass compositions included herein are described in terms of the molar percentage proportions of their stoichiometric oxide components.

The glasses are designed to release zinc and phosphate ions into aqueous solution, and the glass composition is therefore tailored to provide the desired solution rate. The solution rate of the glass is determined primarily by the proportion of acidic glass forming oxide (phosphorus pentoxide) present in the composition. In the composition region comprising less than 50 mol % phosphorus pentoxide, an increase in this proportion increases the glass solution rate. Conversely a decrease in this proportion decreases the glass solution rate. Another factor which determines glass solution rate is the proportion of alumina ($Al_2O_3$). Thus, addition of a quantity of alumina decreases the solution rate of the glass. Conversely, the solution rate of the glass may be changed by the addition of other glass modifying oxides. For example, the solution rate is enhanced by the incorporation of one or more alkali metal oxides.

The effect of glass composition on solution rate is illustrated in FIG. 3 which demonstrates the relationship between phosphorus pentoxide content and solution rate for a range of glass compositions. A desired solution rate within a given range can be obtained by the incorporation of suitable quantities of one or more glass modifying oxides. The technique of solution rate control is more fully described in my U.S. Pat. No. 4,123,248.

The composition described herein are based on the zinc oxide/phosphorus oxide/aluminium oxide ternary system. It is of course not possible to form glasses from every possible composition within this ternary oxide system, and we have found experimentally that the practical glass forming limits for this ternary system are those indicated by the outer shaded area of the ternary diagram of FIG. 1 of the accompanying drawing. The compositions within the practical glass forming limits can be usefully described as a molar percentage by considration of the constituent stoichiometric oxides. The range of compositions depicted in the outer shaded area of FIG. 1 lie between 20.0 to 65.0 mol percent zinc oxide and 66.6 to 35.0 mol percent phosphorus pentoxide, the remainder comprising aluminum oxide.

I have also found that certain glass compositions within this range are particularly effective as anti-corrosion materials, these latter glasses being indicated by the inner cross-hatched region of the phase diagram of FIGS. 1 and 2. The range of compositions depicted within this cross-hatched region lie between 54.6 to 63.3 mol % zinc oxide and 35.8 to 45.3 mol % phosphorus pentoxide, the remainder, comprising at least 0.1 mol % aluminum oxide. These glass compositions are extremely effective in inhibiting corrosion of structural mild steel exposed under accelerated test conditions when the glass is used as a finely ground pigment dispersed in a paint medium applied to the surface of the steel.

Suitable glass compositions having corrosion inhibiting properties are listed in the following table. These compositions are given only as examples and are in no way limiting.

TABLE I

| Batch No. | (mol %) | | |
|---|---|---|---|
| | ZnO | $Al_2O_3$ | $P_2O_5$ |
| 1 | 59.8 | 1.0 | 39.2 |
| 2 | 59.0 | 2.0 | 39.0 |
| 3 | 56.9 | 1.3 | 41.8 |
| 4 | 62.1 | 1.1 | 36.8 |
| 5 | 58.8 | 1.4 | 39.8 |
| 6 | 54.6 | 2.4 | 43.0 |
| 7 | 56.3 | 1.3 | 42.4 |

Two particularly preferred ranges of glass composition are (A) 61.1 to 63.3 mol % zinc oxide, 37.8 to 35.8 mol % phosphorus pentoxide and 0.1 to 2 mol % aluminium oxide; and (B) 55.3 to 57.3 mol % zinc oxide, 43.4 to 41.4 mol % phosphorus pentoxide and 1.0 to 2.0 mol % aluminum oxide. We have also found that specific glasses within these two preferred ranges have the composition of batch Nos. 4 and 7 and are particularly effective at providing corrosion protection for structural steel when disperseed in a paint medium.

The soluble glass pigments may be present in a paint composition either as the entirety of the active pigment volume, or as a partial replacement for certain conventional pigments when they may exhibit a synergistic effect on the inhibition of corrosion. In some applications, glass pigments of different solution rates may be blended in the same paint medium to provide corrosion inhibition both in the short term and over an extended period. This technique may also be employed to optimise the performance of a coating which may be subjected to exposure in environments of different degrees of aggression.

The use of the glasses is not of course limited to paint compositions. Thus they may also be incorporated, for example, in reinforced concrete to prevent corrosion of steel reinforcing rods, or in water repellent grease compositions. In such applications the glasses may be provided in the form of fibres, granules, blocks, powders, stoving enamels etc. They may also be applied to various substrates by plasma spraying, flame spraying, electrostatic coating, etc.

Reference herein to ZnO, $P_2O_5$ and $Al_2O_3$ is not to be construed as limiting the invention to these specific oxides. They are described herein, for simplicity, in terms of the molar proportions of their constituent oxides although these oxides are not necessarily present in their free form.

For simplicity, the starting materials are also referred to as oxides. However one may also employ compounds which decompose to the respective oxides.

The glass compositions are prepared by fusing a mixture of the constituent oxides, or compounds which on heating decompose to form the respective oxides, for a sufficient period of time to form an homogeneous melt. For example one or more of the metal oxides may be substituted by the metal carbonate, acetate, citrate or mixtures thereof. The phosphorus content of the glass may be added as phosphorus pentoxide, ammonium dihydrogen phosphate, aqueous phosphoric acid or mixtures thereof. Advantageously a slight excess of the phosphorus compound may be provided in the mix to compensate for the loss by evaporation of phosphorus pentoxide during the fusion process. The melt so formed is quenched rapidly to solid material by pouring either on to a cold steel plate or on to water-cooled rollers. Quenching may also be achieved by pouring the molten glass into a bath of water or an oil. We have found that, although the glass is water soluble, its solution rate is sufficiently low that only a small proportion is lost by dissolution when water quenching is employed as the glass is in contact with water only for a short time.

The quenched material, which may be in the form of flakes, granules or slabs, is then comminuted to a fine powder by one or more stages of crushing or grinding. Typically the glass is jaw crushed, or dry milled in a pestle and mortar or pin disc mill, or wet ground in a rotary or vibratory ball mill followed by drying, or by air impact milling. Any other methods well known in the art can also be employed.

The powdered glass thus manufactured may be incorporated in a paint vehicle to form a corrosion inhibiting primer by two-stage ball milling, high speed dispersion or by other means well known in the art. We prefer to use an alkyd resin as the paint binder medium, but it will be appreciated by those skilled in the art that other conventional resins or binders can be employed, e.g. epoxy resins, acrylics or chlorinated rubbers.

For structural applications in which thick coatings are used, i.e. 50 to 100 microns thickness or even more, the glass should be comminuted to a final size in which the majority by weight of the particles are from about 10 to about 60 microns, preferably 20 to 40 microns in average diameter.

Unlike prior corrosion resistant compositions, the glasses of the invention are essentially colorless. Thus, they may be used in paint compositions as the sole pigment or together with the desired final coloring pigment. As such, a simple coating of the present compositions will in many instances be adequate for both corrosion resistance and final color. Thus, the present paint compositions may be the sole paint coating on a metal surface.

By way of example, the compositions listed in Table I were individually prepared by blending together appropriate amounts of zinc oxide, ammonium dihydrogen phosphate and aluminum hydroxide, and fusing to form a melt at elevated temperature. The melts so formed were then quenched by pouring onto a cold steel plate and the glass obtained was successively crushed, granulated, pin-disc milled and finally wet milled in a non-aqueous medium in a vibratory ball mill. The wet slurry of powdered glass was then dried. These glasses were analysed and gave the compositions listed in Table I. These were then evaluated by preparing small quantities of test paints to the formulations listed in the following table:

TABLE III

Test paint formulations:

| Volume concentration of active glass pigment (% v/v) | Proportion of active to total pigment (% w/w) | |
|---|---|---|
| | long oil alkyd binder | Chlorinated rubber binder |
| 3 | 6 | 6 |
| 10 | 23 | 24 |
| 25 | 66 | 67 |

The paints are prepared by two-stage ball-milling to a fineness of grind over 10 microns and were then applied to clean mild steel coupons by brushing and allowed to cure for several days. The coating was then cross-cut and the lower half top coated with a proprietory alkyd white gloss paint.

The coupons were then subjected to accelerated and natural test schedules as defined in British Standard No. 3900 using commercially available priming paints for comparison.

The results of such testing procedures showed that the glass pigments gave effective protection against corrosion at significantly lower loadings in a paint coating that those specified for conventional pigments such as zinc orthophosphate, when evaluated either by resistance to rusting or lack of blistering of the paint film. In particular, paints containing soluble glass pigments are especially effective in preventing rusting or lack of blistering of the paint film. In particular, paints containing soluble glass pigments are especially effective in preventing rusting of steel surfaces where the dried paint film has been removed by mechanical damage.

The invention is illustrated by, but in no way limited to, the following examples.

EXAMPLE 1

Measured amounts of zinc orthophosphate, aluminum hydroxide, and concentrated phosphoric acid were blended to a homogeneous paste. Each mix was fused to a homogeneous melt and was then quenched to a glass by pouring onto a cold steel plate. The glass was comminuted to a fine powder by successively crushing, dry milling, and wet milling. Two of the glass pigment batches obtained were analysed and found to have the following characteristics:

| | | A | B |
|---|---|---|---|
| Chemical composition (mol %) | ZnO | 56.2 | 62.3 |
| | $Al_2O_3$ | 1.3 | 1.0 |
| | $P_2O_5$ | 42.5 | 36.1 |
| Dissolution rate (g $m^{-2}day^{-1}$) | | 210 | 65 |
| Specific surface area ($m^2g^{-1}$) | | 0.17 | 0.17 |
| Specific gravity (g $ml^{-1}$) | | 3.1 | 3.4 |

EXAMPLE 2

Test paints, incorporating the two pigments A and B from the previous example, were prepared by high-speed dispersion grinding of the following ingredients:

| Ingredient | Weight (g) |
|---|---|
| Glass pigment (A or B) | 98 |
| Other pigments (hiding and extending) | 311 |
| Alkyd resin | 277 |
| Additives | 4 |
| White spirit | 83 |

Grinding was continued until the paint showed a fineness of grind better than 30 microns when measured on a fineness of grind gauge (to British Standard 3900: Part C6:1970). The flow time of the paint was measured as 4 minutes using a B4 cup and the method defined in BS 3900: Part A6: 1971.

Mild steel coupons for accelerated testing were prepared by bead-blasting and cleaning in trichloroethylene, and a coat of primer was applied to each coupon by air-spraying. The coatings were then allowed to cure for 3 days after which a hardened steel tool was used to cross-cut the panels. The lower halves of the panels were then over coated with a propriety white alkyd gloss paint.

The coupons were subjected to accelerated testing according to the following procedures:

| Salt spray: | to BS 3900: | Part F4 |
|---|---|---|
| $SO_2$ fog: | to BS 1391 | |

High humidity: exposure in an enclosed space above a water-bath maintained between 35° and 40° C.

Tests were carried out in duplicate in order to ensure repeatability and reliability of testing as far as possible.

The results of the tests are summarised in Table III.

TABLE III

Results of accelerated testing of mild steel coupons coated with alkyd test paints

| Active pigment | Proportion of active in total pigment (% w/w) | 450 hrs. in salt spray | 250 hrs in SO$_2$ fog | 250 hrs in high humidity |
| --- | --- | --- | --- | --- |
| Pigment A | 10 | Slight rusting and blistering of primer film. No breakthrough of gloss coat | Slight rusting. No blistering. | Slight rusting of primer film: no blistering. |
| Pigment B | 10 | Very little rusting, even in cross-cut. Blistering almost entirely absent. | No blistering or rusting. | No blistering. Moderate rusting of primer film and cross-cuts. |
| Zinc* orthophosphate | 40 | Severe rusting of primer film and cross-cut. Considerable pustuling even under gloss coat. | Moderate rusting of primer film. Considerable blistering. | Considerable rusting and pustuling visible through the over-coated portion. |

*Commercially available high build primer for comparison.

I claim:

1. A water soluble glass composition consisting essentially of 54.6 to 63.3 mol % zinc oxide, 35.8 to 45.3 mol % phosphorus pentoxide, the remainder comprising at least 0.1 mol % aluminum oxide.

2. The glass composition of claim 1 wherein said glass includes up to 3 mol % aluminum oxide.

3. The glass composition of claim 1 wherein said glass includes from 1.1 to 2.4 mol % aluminum oxide.

4. A water soluble glass composition in which the glass comprises 61.1 to 63.3 mol % zinc oxide, 35.8 to 37.8 mol % phosphorus pentoxide and from 0.1 to 2.0 mol % aluminum oxide.

5. The glass composition of claim 4 in which the glass comprises 62.1 mol % zinc oxide, 36.8 mol % phosphorus pentoxide and 1.1 mol % aluminum oxide.

6. The glass composition of claim 1 in which the glass comprises 55.3 to 57.3 mol % zinc oxide, 41.4 to 43.4 mol % phosphorus pentoxide and 1.0 to 2.0 mol % aluminum oxide.

7. The glass composition of claim 6 in which the glass comprises 56.3 mol % zinc oxide, 42.4 mol % phosphorus pentoxide and 1.3 mol % aluminum oxide.

8. The glass composition of claim 1 which comprises a minor proportion of a glass modifying oxide.

9. The glass composition of claim 1 in the form of fibres, granules, sheets, powder, blocks, vitreous or stoving enamel, flame sprayed coating or plasma sprayed coating on ferrous metal substrates.

10. A paint composition adapted to inhibit corrosion of a metal surface to which it is applied, the composition including a water soluble glass composition dispersed in a paint binder in which said glass composition comprises 54.6 to 63.3 mol % zinc oxide, 35.8 to 45.3 mol % phosphorus pentoxide, the remainder comprising at least 0.1 mol % aluminum oxide.

11. The paint composition of claim 10 in which said glass composition comprises 61.1 to 63.3 mol % zinc oxide, 35.8 to 37.8 mol % phosphorus pentoxide and from 0.1 to 2.0 mol % aluminum oxide.

12. The paint composition of claim 10 in which said glass composition comprises 55.3 to 57.3 mol % zinc oxide, 41.4 to 43.4 mol % phosphorus pentoxide and 1.0 to 2.0 mol % aluminum oxide.

13. The paint composition of claim 10 in which said binder is a resin selected from the group consisting of an alkyd resin, a chlorinated rubber, an epoxy resin and an acrylic resin.

14. The paint composition of claim 10 in which the glass composition is in comminuted form, the average particle size of the glass particles being from about 10 to 60 microns.

15. The process of making a corrosion inhibiting paint composition comprising providing a fine powder by:
fusing a composition consisting essentially of 54.6 to 63.3 mol % zinc oxide, 35.8 to 45.3 mol % phosphorus pentoxide and at least 0.1 mol % alumina or precursors thereof to form an homogeneous melt, the quantities of the oxides being such that upon quenching they form a glass,
quenching the melt to form a solid glass,
comminuting the solid glass to the fine powder;
and dispersing the powder in a paint binder medium.

16. The process of claim 15 in which the quenched solid material contains up to 3.0 mol % alumina.

17. The process of claim 16 in which the solid material is comminuted to an average particle size of from about 10 to about 60 microns.

18. A process of inhibiting the corrosion of a metal surface comprising
coating said surface with a paint composition containing a water soluble glass composition dispersed in a paint binder in which said glass composition comprises from 35.8 to 45.3 mol % phosphorus pentoxide and from 54.6 to 63.3 mol % zinc oxide as its major constituents which together provide the glass forming oxide and glass modifying oxide respectively of said glass, said glass also comprising a minor proportion of aluminum oxide.

19. The process of claim 18 in which the glass composition comprises at least 0.1 mol % aluminum oxide.

20. The process of claim 18 in which the surface is a ferrous metal.

21. The process of claim 18 in which said coating is the sole paint coating on said metal surface.

22. The process of claim 20 in which said sole coating is applied to said metal surface as a single coat.

23. The process of claim 18 in which the glass composition in said paint is in comminuted form and has a particle size ranging from 10 to 60 microns.

24. The process of claim 18 in which said surface is a structural metal surface and the coating thereon is at least 50 microns thick.

25. The process of claim 18 in which the coating is applied electrostatically.

* * * * *